US008211356B1

(12) United States Patent
Hartnett et al.

(10) Patent No.: US 8,211,356 B1
(45) Date of Patent: Jul. 3, 2012

(54) METHOD OF MAKING ALUMINUM OXYNITRIDE

(75) Inventors: Thomas M. Hartnett, Nashua, NH (US); Joseph M. Wahl, Lexington, MA (US)

(73) Assignee: Surmet Corporation, Burlington, MA (US)

( * ) Notice: Subject to any disclaimer, the term of this patent is extended or adjusted under 35 U.S.C. 154(b) by 0 days.

(21) Appl. No.: 09/618,741

(22) Filed: Jul. 18, 2000

(51) Int. Cl.
C04B 35/10 (2006.01)

(52) U.S. Cl. ......... 264/663; 264/681; 423/385; 423/630

(58) Field of Classification Search .......... 423/385, 423/630; 264/663, 681
See application file for complete search history.

(56) References Cited

U.S. PATENT DOCUMENTS

| 1,030,929 A | * | 7/1912 | Serpek |
| 4,481,300 A | | 11/1984 | Hartnett et al. ............ 501/98 |
| 4,520,116 A | | 5/1985 | Gentilman et al. ......... 501/98 |
| 4,686,070 A | | 8/1987 | Maguire et al. |
| 4,720,362 A | | 1/1988 | Gentilman et al. |
| 5,112,579 A | | 5/1992 | Dunn et al. |
| 5,135,814 A | | 8/1992 | Dekosky ................. 428/432 |
| 5,925,584 A | * | 7/1999 | Dodds et al. |
| 6,042,370 A | | 3/2000 | Wiede |

FOREIGN PATENT DOCUMENTS

| EP | 0284222 A1 | 9/1988 |
| FR | 2594109 A1 | 8/1987 |

OTHER PUBLICATIONS

Abstract of JP403023269A, Jan. 1991.*
"What is a Rotary Kiln?" from www.feeco.com Nov. 24, 2006.*
Perry et al. "Chemical Engineer's Handbook" 5$^{th}$ ed. 1984, McGraw-Hill, pp. 4-3, 4-4, 4-20, and 4-21.*
James W. McCauley et al.; "Phase Relations and Reaction Sintering of Transparent Cubic Aluminum Oxynitride Spinel (ALON)"; Journal of the American Ceramic Society; vol. 62, No. 9-10; pp. 476-479.
Normand D. Corbin; "Aluminum Oxynitride Spinel: A Review"; Journal of the European Ceramic Society 5 (1989); No. 3; pp. 143-154.
Li Yawei, Li Nan et al.; "Carbothermal reduction synthesis of aluminum oxynitride spinel powders at low temperatures"; Journal of Materials Science Letters 16 (1997); pp. 185-186.

* cited by examiner

Primary Examiner — John Hoffmann
(74) Attorney, Agent, or Firm — Daly, Crowley, Mofford & Durkee, LLP

(57) ABSTRACT

A method of making aluminum oxynitride includes introducing a mixture having aluminum oxide and carbon into a chamber, agitating the mixture within the chamber, and heating the mixture to make aluminum oxynitride.

1 Claim, 7 Drawing Sheets

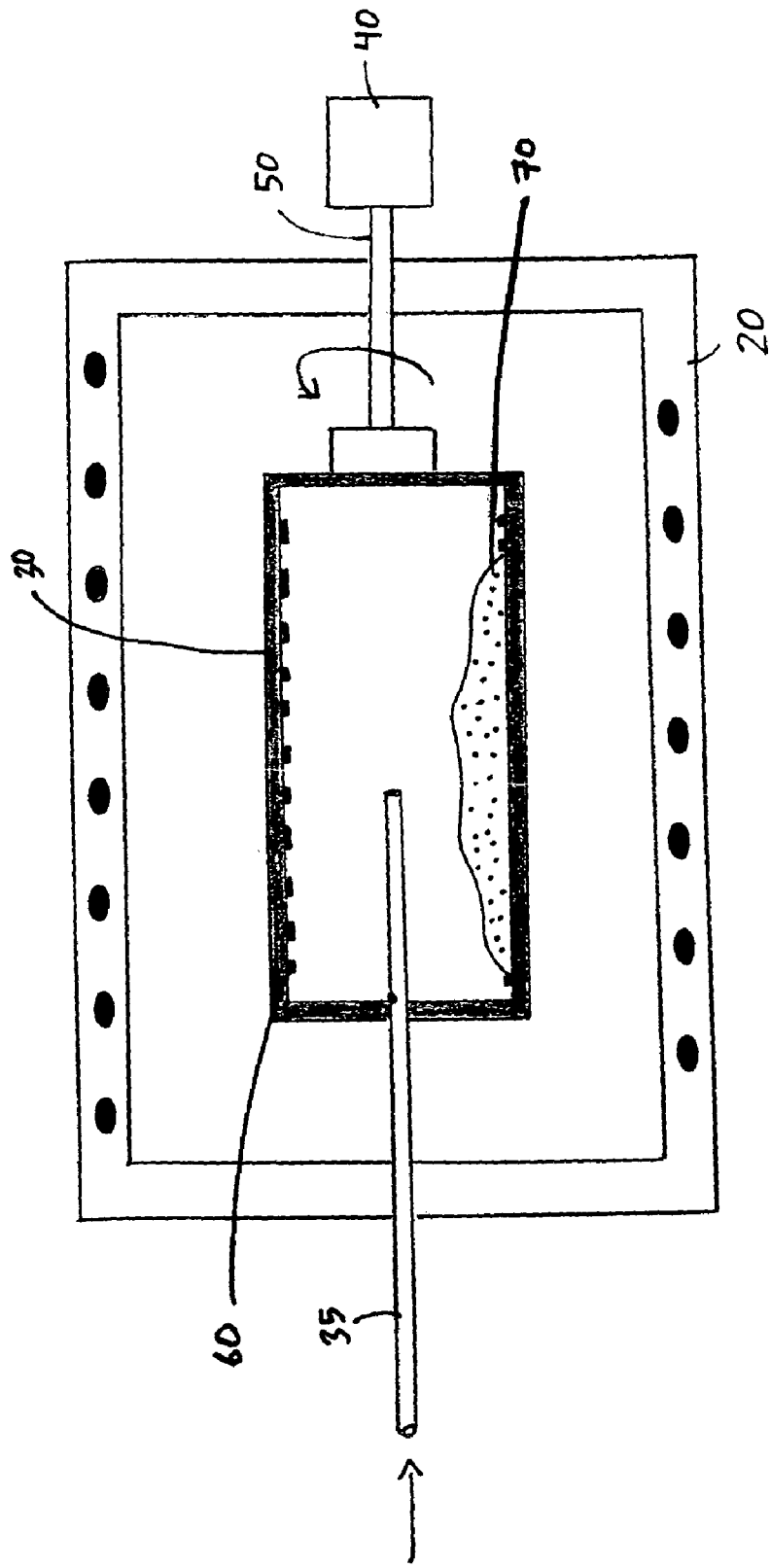

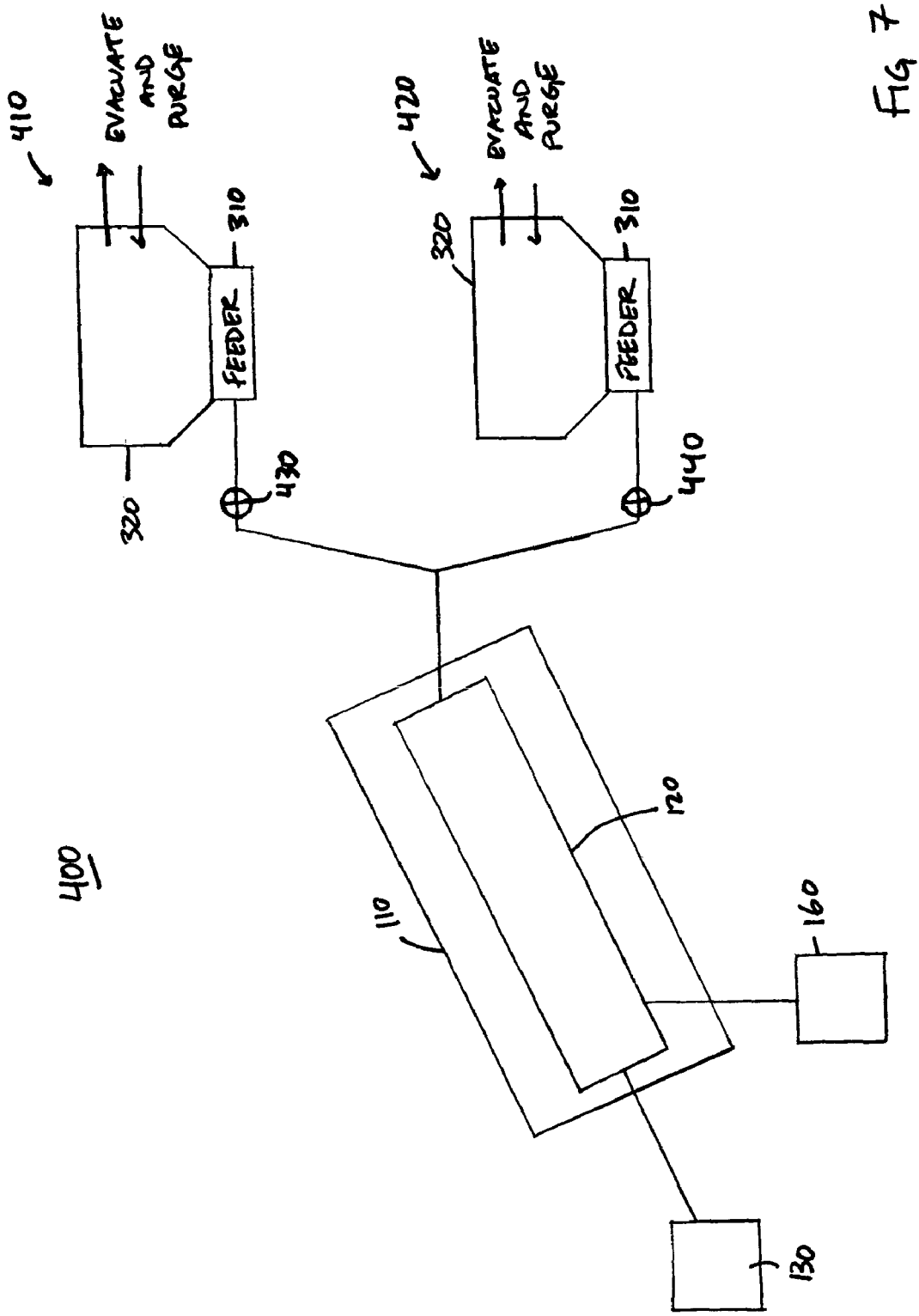

METHOD OF MAKING ALUMINUM OXYNITRIDE

BACKGROUND

This invention relates to ceramic compounds and more particularly to aluminum oxynitride.

As is known in the art, aluminum oxynitride having the chemical composition $Al_{23-1/3x}O_{27+x}N_{5-x}$, $0.429 \leq x \leq 2$ (AlON) is a ceramic material that has a wide range of uses because of its relatively high degree of transparency over the optical wavelength range of about 0.2 microns up to about 5 microns. Accordingly, AlON can be used in applications that require transmission and imaging capabilities in the visible and infrared wavelength ranges. These applications include both commercial and military applications, such as, for example, transparent envelopes for vapor lamps, optical windows, ballistic armor, scanner windows, watch crystals, and transparent domes for airborne optical imaging systems, such as those found on infrared heat-seeking missiles.

In addition, because AlON can have a relatively high degree of strength, AlON can also serve as a protective barrier for systems that may be exposed to certain demanding external environments. For example, AlON can be formed as a window or a dome for an exterior portion of a missile.

AlON can be synthesized by a process sometimes called carbothermal nitridation. Generally, in this process, alumina ($Al_2O_3$) is mixed with carbon (C), and this mixture is reacted under a nitrogen-containing atmosphere, e.g., dinitrogen ($N_2$), at high temperatures, e.g., about 1650-1850° C. The specific reactions that occur in the process are represented in equations 1-2.

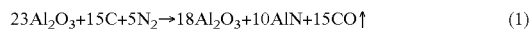
$$23Al_2O_3 + 15C + 5N_2 \rightarrow 18Al_2O_3 + 10AlN + 15CO\uparrow \quad (1)$$

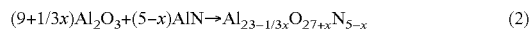
$$(9+1/3x)Al_2O_3 + (5-x)AlN \rightarrow Al_{23-1/3x}O_{27+x}N_{5-x} \quad (2)$$

As shown in Equation 1, a portion of alumina, carbon, and nitrogen react to form aluminum nitride, and carbon monoxide gas is produced. This reaction can occur at about 1650-1750° C. The formed aluminum nitride then reacts with alumina, e.g., at about 1750-1850° C., to form AlON. Synthesis of AlON by carbothermal nitridation, e.g., by conventional batch processing, can take up to about 20 to 30 hours to complete.

SUMMARY

In accordance with the present invention, a method is provided for making aluminum oxynitride. The method includes: introducing aluminum oxide particles into a chamber, dispersing the particles within the chamber, and forming the aluminum oxynitride including passing nitrogen gas over the dispersed particles.

With such method, large quantities of aluminum oxyniride may be practically produced.

In one embodiment, the method includes a batch rotary process or a semi-continuous rotary process in which a reaction mixture is dispersed or tumbled during reaction. Dispersing the reaction mixture can shorten the reaction time, produce a more uniform AlON composition, and produce a free flowing AlON powder compared to conventional carbothermal nitridation, thereby, e.g., lowering costs of production.

In addition, the semi-continuous process can shorten the time needed to synthesize multiple batches of AlON, for example, by reducing the time needed to ramp the furnace to a soak temperature, the time needed for the furnace to cool, and the time needed to re-load the retort and to remove the formed AlON from the retort. The semi-continuous process also provides convenient handling of reactants and products.

In another aspect of the invention, a method of making aluminum oxynitride includes introducing a mixture having aluminum oxide and carbon into a chamber, agitating the mixture within the chamber, and heating the mixture to make aluminum oxynitride.

Embodiments of the invention may include one or more of the following features. The method further includes introducing nitrogen gas into the chamber. Agitating the mixture includes rotating the chamber. The method further includes cooling the aluminum oxynitride, removing the aluminum oxynitride from the chamber, and introducing a second mixture having aluminum oxide and carbon into the chamber. The method further includes forming the aluminum oxynitride into a transparent structure. Forming the aluminum oxynitride includes forming a green body having the aluminum oxynitride, and sintering the green body. The method further includes isostatically pressing the sintered green body under heat. The aluminum oxynitride includes $Al_{23-1/3x}O_{27+x}N_{5-x}$, where $0.429 \leq x \leq 2$.

In another aspect of the invention, a method of making aluminum oxynitride includes introducing a first reaction mixture having aluminum oxide and carbon into a chamber, agitating the first reaction mixture within the chamber, heating the chamber to a temperature to form aluminum oxynitride from the first reaction mixture, removing the aluminum oxynitride while maintaining the temperature of the chamber, and introducing a second reaction mixture having aluminum oxide and carbon into the chamber while maintaining the temperature of the chamber. The chamber can include an exit opening, and removing the aluminum oxynitride may include retracting a plunger within the chamber, thereby allowing the aluminum oxynitride to flow through the exit opening.

In another aspect of the invention, a continuous method of making aluminum oxynitride includes heating a chamber, continuously introducing a reaction mixture comprising aluminum oxide and carbon into the chamber, agitating the reaction mixture within the chamber, and continuously providing the aluminum oxynitride. The continuous process can offer similar advantages as the semi-continuous process.

These and other features, objects, and advantages of the invention will be apparent from the description and drawings, and from the claims.

DESCRIPTION OF DRAWINGS

FIG. 2 is a schematic diagram of an embodiment of a system for making AlON;

FIG. 7 is a schematic diagram of an embodiment of a system for making AlON.

DETAILED DESCRIPTION

Figure 1:
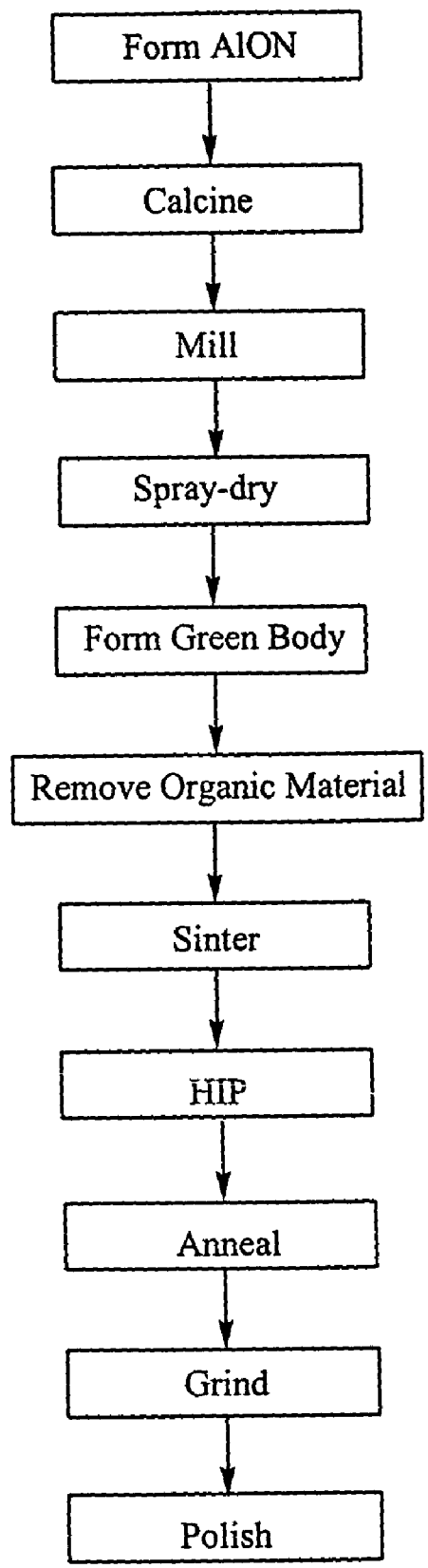
FIG. 1 is a block diagram of a method for making an aluminum oxynitride (AlON) structure.

FIG. 1 shows a method of making an AlON structure, e.g., an AlON dome. Generally, AlON powder is formed by reacting $Al_2O_3$ and carbon in a nitrogen atmosphere at high temperatures. The formed AlON powder is calcined to remove unreacted carbon and milled to reduce the particle size of the AlON powder. The milled AlON is then sprayed dried to agglomerate the AlON particles and to form a flowable powder that can be conveniently poured into a mold to form a green body. The green body, having the approximate size of the structure, is formed by cold isostatic pressing. After pressing, the green body is heated to remove organic material, sintered to densify the structure, and further densified by hot isostatic pressing. The structure is then annealed and finished to the structure's final tolerances by grinding and polishing.

Figure 3A:
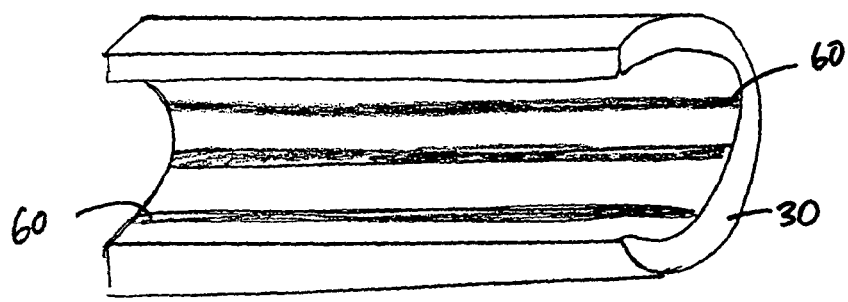
FIGS. 3A-B are cut-away perspective views of embodiments of retorts.
Figure 3B:
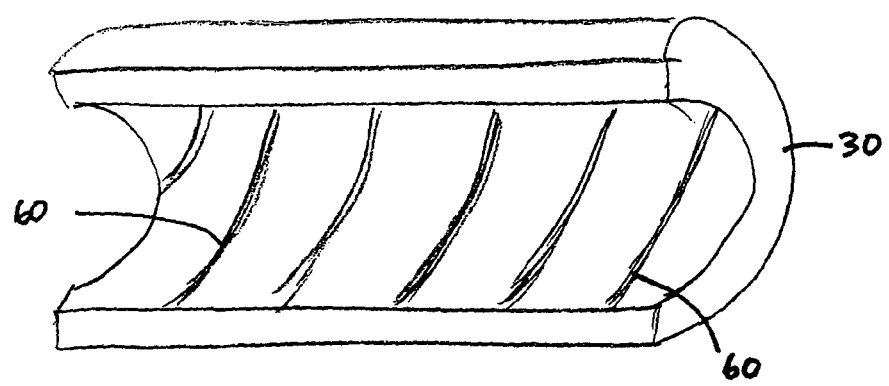

Referring to FIG. 2, the AlON powder is here formed by a batch rotary process. A batch rotary system 10 includes a furnace 20, a cylindrical graphite chamber, here a retort 30 inside furnace 20, and a flow tube 35 for delivering nitrogen gas into retort 30. Retort 30 is connected to a drive motor 40 via a drive shaft 50 so that motor 40 can rotate retort 30. Retort 30 also defines a plurality of agitator or lifter bars 60 (shown in FIGS. 3A-B) on the interior surface of retort 30. Lifter bars 60 are ridges or bumps integrally formed with retort 30 that extend or spiral alone the length of retort 30. Furnace 20 and retort 30 are available from Centorr Vacuum Industries (Nashua, N.H.).

Generally, as retort 30 rotates, lifter bars 60 help to disperse a reaction mixture 70 of alumina and carbon within retort 30 by lifting and allowing reaction mixture 70 to fall inside retort 30. It is believed that tumbling mixture 70 during reaction exposes fresh, unreacted mixture 70 to nitrogen, thereby aiding diffusion of nitrogen and shortening the reaction time needed to from AlON.

Reaction mixture 70 is formed by mixing alumina with carbon. Typically, reaction mixture includes between about 4.5 to about 8% by weight carbon, and more preferably between about 4.5% to about 6.5% by weight carbon. The alumina is a gamma-$Al_2O_3$ available from, e.g., Condea Vista (Tucson, Ariz.), although other forms of alumina, such as, for example, alpha-$Al_2O_3$ may be used. The carbon is a pure (dry) carbon black, e.g., Monarch 880, available from Cabot Corp. (Billerica, Mass.). Other grades of carbon black may also be used. Preferably, the moisture content and volatile content of the alumina and the carbon are accurately known so that the carbon content in mixture 70 can be controlled within prescribed limits.

A homogeneous mixture of alumina and carbon is preferred so that a uniform composition of AlON can be formed. The alumina and carbon can be dry blended by mixing in a blender, ball milled (dry or wet), and/or shaken in a mixer (e.g., in a paint shaker). Preferably, the carbon is a carbon ink, which is convenient to handle and provides good mixing with the alumina. The carbon ink is formed by mixing carbon black with water or an organic solvent, such as methanol, ethanol, and propanol. A dispersant, such as, for example, Disperbyk 190 or 191, available from, e.g., BYK-Chemie, is added to the ink to wet the carbon black and to help keep the carbon black in suspension. Carbon ink is also commercially available from, e.g., Sun Chemical (Winston-Salem, N.C.) and Borden Chemical Inc. (Cincinnati, Ohio). Preferably, the carbon ink solution is formed and/or diluted to form a solution having between about 5 and about 10% by weight carbon to provide uniform wetting of the alumina.

The alumina and carbon ink are mixed in a cone blender having an intensifier blade or bar for about 30 to 90 minutes, or until reaction mixture 70 is blended and uniform. A typical charge for mixing is 15 kg, although the size of charge is a function of the equipment used. The liquid (e.g., water and solvent) is removed by evaporation prior to charging retort 30, preferably in the same cone blender used for mixing. Alternatively, the mixture of alumina and carbon ink can be spray dried to form a free-flowing powder prior to charging. A charge of reaction mixture 70, e.g., about 500 g, is then placed in retort 30 by removing an end cap (not shown) of retort 30, charging retort 30, and placing the end cap back on retort 30.

After placing a charge of reaction mixture 70 in retort 30, retort 30 is evacuated of air and purged with high purity nitrogen gas. Generally, the nitrogen gas flow rate must be sufficient to restrict the carbon monoxide or carbon dioxide local concentrations from poisoning of the AlON reaction. Suitable gas flow rates depend on the size of the reaction retort and the mass of the mixture 70 being processed. For mixtures 70 of about 5 to about 20 kg, the nitrogen flow rates are about 2 to about 20 L/min.

Retort 30 is then rotated by activating drive motor 40, and reaction mixture 70 is heated. The rotation speed is about 2-50 rotations per minute. The effect of the rotation is to disperse the alumina/carbon particles in the chamber and enable the nitrogen gas to pass around the dispersed particles and thereby facilitate the reaction between the alumina/carbon particles and the nitrogen. Accordingly, the rotation speed should be fast enough to disperse reaction mixture 70 inside retort 30, but not so fast that reaction mixture 70 is centrifuged inside retort 30, thereby preventing the reaction mixture from tumbling. Reaction mixture 70 is heated in the chamber at ramp rate of greater than 10-20° C./min to a soak temperature of about 1700-1900° C., preferably about 1825° C. The soak time is about 10-30 minutes, preferably about 15 minutes. After reaction mixture 70 has soaked at the predetermined soak temperature and for the predetermined soak time, furnace 20 is turned off, and reaction mixture 70, now AlON powder, is allowed to cool, typically taking about 4 hours. The cooled AlON powder is removed from retort 30, and another charge of reaction mixture 70 is added to retort 30 to form another batch of AlON.

Thus, rotary system 10 described above is used as part of a batch process. Each batch of AlON powder is formed by loading reaction mixture 70 in retort 30, heating mixture 70, cooling mixture 70, and removing formed AlON from retort 30. For every batch of AlON powder formed, furnace 20 is heated and cooled.

Figure 4:
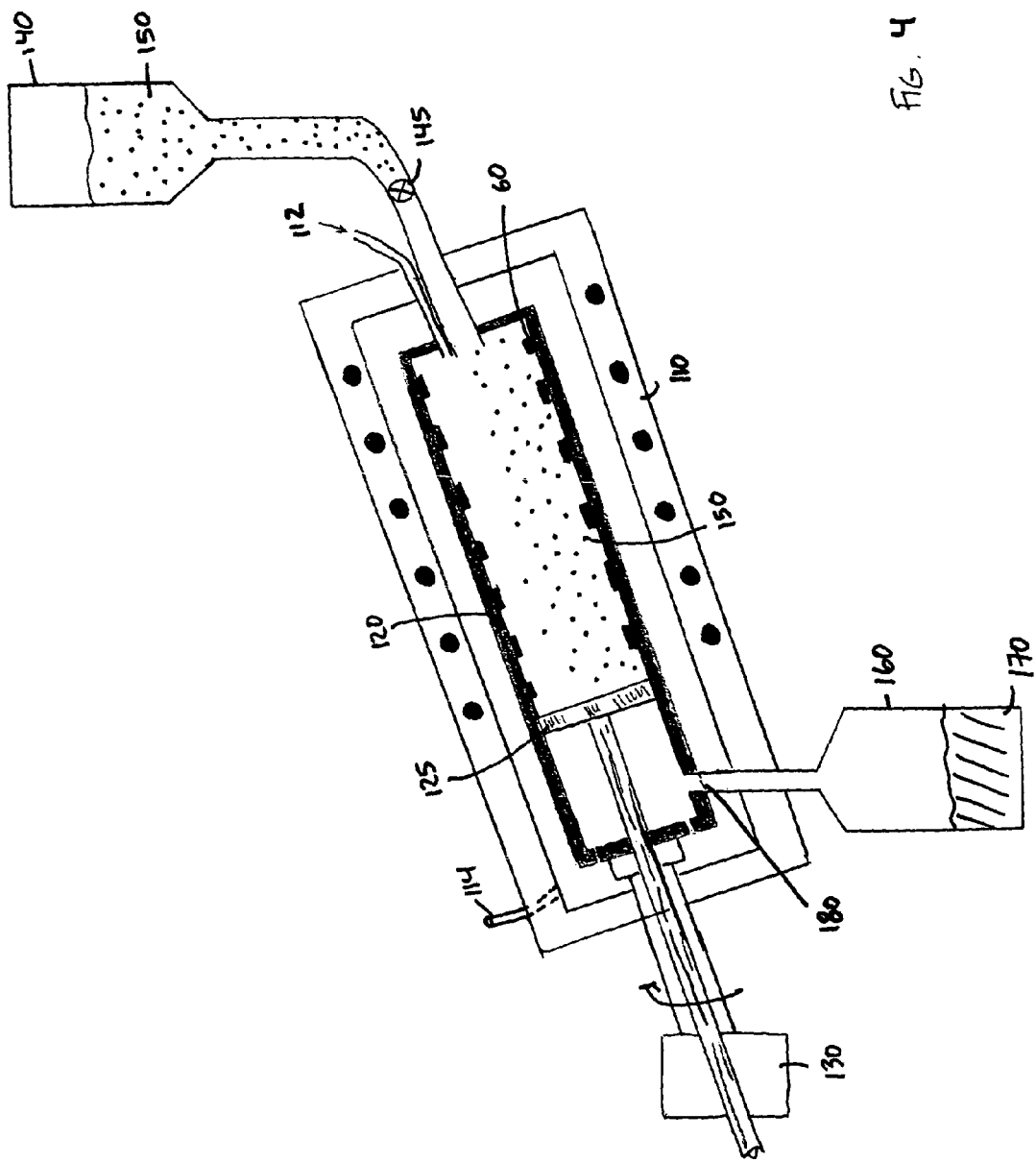
FIG. 4 is a schematic diagram of an embodiment of a system for making AlON having a plunger in an extended position.

In another method of forming AlON, the AlON powder is formed by a semi-continuous rotary process in which the furnace is held at a constant soak temperature for multiple batches of AlON. Referring to FIG. 4, a semi-continuous rotary system 100 includes a furnace 110, a feed hopper 140, a graphite retort 120 inside furnace 110, a drive motor 130, and a collection hopper 160. Furnace 110 includes a nitrogen inlet 112 and a nitrogen outlet 114. When furnace 110 is in use, nitrogen gas flows from inlet 112, through retort 120, and is vented through outlet 114. Feed hopper 140 includes a valve 145 and is used for supplying a reactant mixture 150 (similar to mixture 70) to retort 120. Retort 120, similar in construction to retort 30, is angled downwardly from hopper 140 and is rotatable inside furnace 110 via drive motor 130. Retort 120 includes a graphite plunger 125 moveably located, e.g., extendable to a plurality of positions, inside retort 125. Retort 120 also includes an opening 180 for removing formed AlON powder, as described below. Collection hopper 160 is used for receiving formed AlON powder 170. Because collection hopper 160 receives hot AlON powder 170, the interior surface of drum 160 is made of a non-contaminating material or refractory, such as, for example, alumina and graphite. Rotary system 100 is available from Centorr Vacuum Industries and Harper International (Lancaster, N.Y.).

Figure 5:
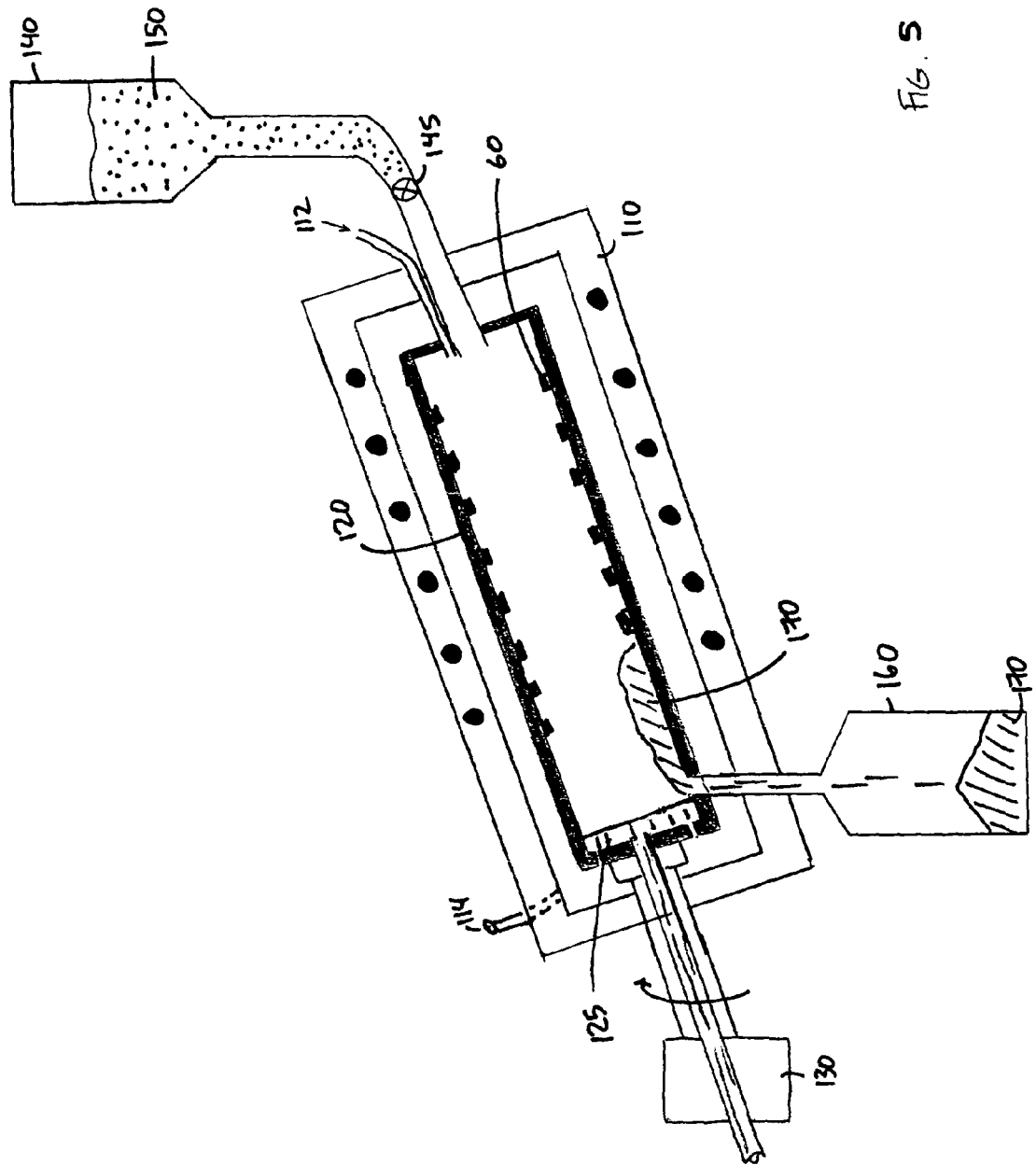
FIG. 5 is a schematic diagram of an embodiment of a system for making AlON having a plunger in a retracted position.

In operation, furnace 110 is heated to the soak temperature (e.g., about 1700-1900° C.) and retort 120 (with agitator bars, not shown) is rotating. Here again the retort, or chamber action causes the alumina/carbon particles to disperse. Nitrogen gas flows in inlet 112 and out outlet 114. Plunger 125 is extended past opening 180 so that when reactant mixture 150 is charged into retort 120, mixture 150 is retained in retort 120. Reactant mixture 150, generally the same as reactant mixture 70, is charged into retort 120 from hopper 140 by opening valve 145 until a predetermined amount of mixture 150 is in retort 120. Reaction mixture 150 is dispersed in retort 120 and allowed to react, e.g., for about 10-30 minutes. Thus, here again the nitrogen is able to pass around the dispersed alumina particles After mixture 70 has reacted to form AlON powder, plunger 125 is retracted (FIG. 5) so that the AlON powder can flow through opening 180 and into collection drum 160. The temperature of retort 120 is still at the soak temperature. Plunger 125 is then repositioned, e.g., extended past opening 180 (FIG. 4), and another batch of AlON powder can be formed by charging reactant mixture 150 into retort 120 from hopper 140. Thus, in this semi-continuous process, multiple batches of AlON can be formed without having to turn furnace 110 on and off for each batch of AlON. This process can shorten the time needed to synthesize multiple batches of AlON by reducing the time needed to ramp the furnace to the soak temperature, the time needed for the furnace to cool, and the time needed to charge the retort and to remove the formed AlON from the retort.

Figure 6:
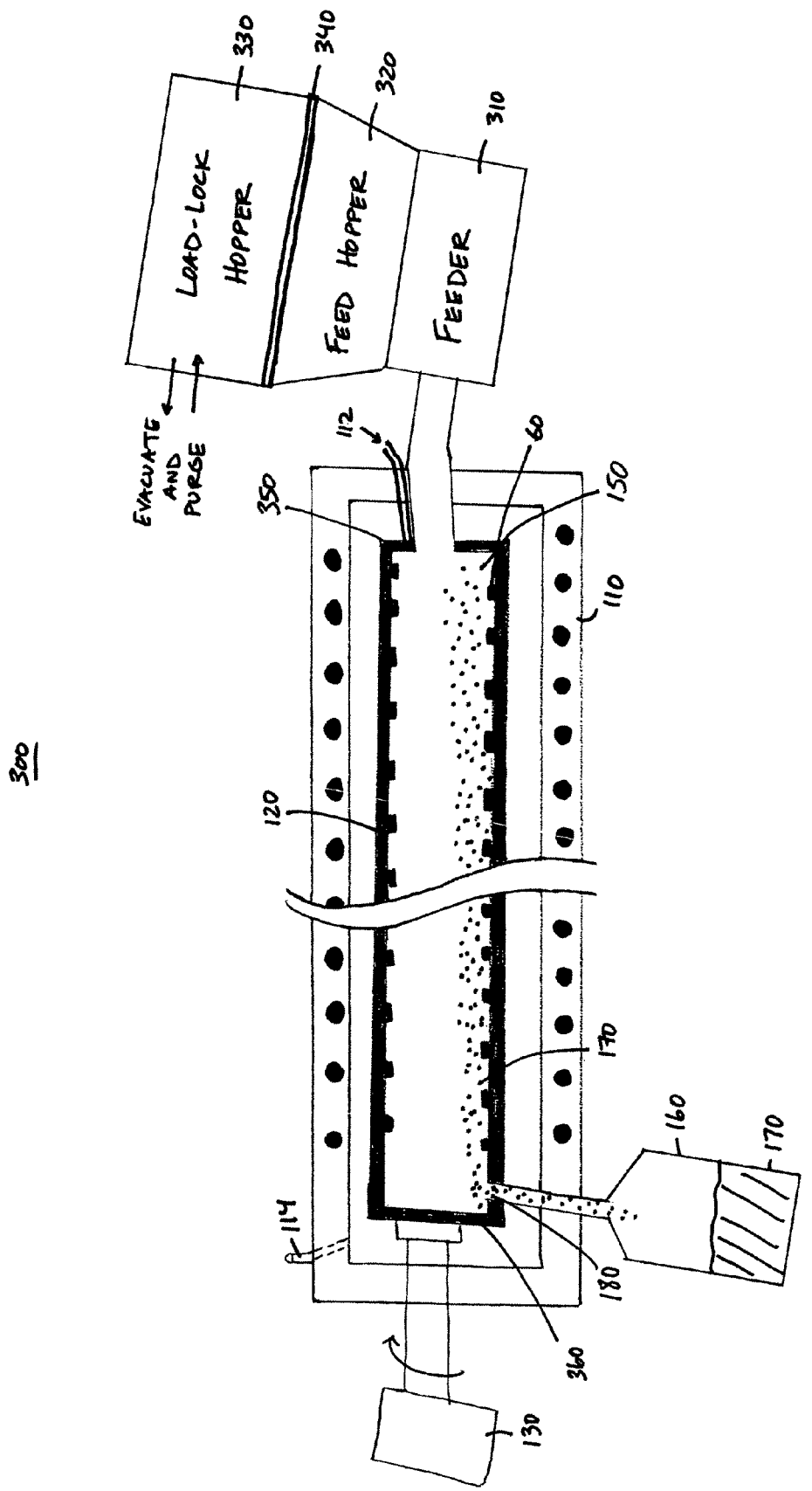
FIG. 6 is a schematic diagram of an embodiment of a system for making AlON.

In another method of forming AlON, the AlON powder is formed by a continuous rotary process. Referring to FIG. 6, a continuous rotary system 300 includes a furnace 110, a graphite retort 120 inside furnace 110, a drive motor 130, and a collection hopper 160 for collecting the product mixture 170 (formed AlON). System 300 further includes a feeder 310, a feed hopper 320, a load-lock hopper 330, and a gate valve 340 between feed hopper 320 and load-lock hopper 330. Retort 120 is similar in construction to the retorts described above, e.g., angling downwardly from feeder 310 and rotatable inside furnace 110 via drive motor 130. Furthermore, retort 120 of system 300 is constructed with sufficient length such that as reaction mixture 150 travels from input end 350 of retort 120 to output end 360 of retort 120, the residence time of mixture 150 in heated retort 120 is sufficient for mixture 150 to form AlON. In other words, retort 120 is made sufficiently long such that reaction mixture 150 that is introduced into retort 120 from feeder 310 is converted into AlON 170 by the time the reaction mixture reaches opening 180.

In operation, furnace 110 is heated to the soak temperature and retort 120 is rotating to disperse the alumina/carbon particles that are introduced into retort 120. Nitrogen gas flows in inlet 112 and out outlet 114. With gate valve 340 closed, reactant mixture 150 is loaded into load-lock hopper 330, which is evacuated of air and purged with nitrogen. Purging system 300 with nitrogen helps to prolong the life of the graphite retort. Reactant mixture 150 is then introduced into feed hopper 320 by opening gate valve 340. Feed hopper 320 introduces mixture 150 into feeder 310, which introduces mixture 150 into retort 120 at a predetermined rate, e.g., volumetrically or gravimetrically. Feeder 310 can be, for example, a screw feeder and shaker feeder. As the charge in feed hopper 320 decreases, more reactant mixture 150 can be provided through load-lock hopper 330, as described above. Feed hopper 320 can be made sufficiently large to minimize the frequency at which hopper 320 needs to be re-loaded.

Thus, by selecting the proper dimensions of retort 120 and adjusting the feed rate of reactant mixture 150, the temperature of the furnace 110, and rotation speed of retort 120, system 300 can produce a continuous output of AlON. Other experimental parameters, e.g., nitrogen flow rate and particle size, can be adjusted to optimize output and composition uniformity.

FIG. 7 shows another embodiment of a continuous rotary process for making AlON. System 400 is generally similar to system 300 but includes two feeding assemblies 410 and 420 placed in parallel with retort 120, and two valves 430 and 440. Each assembly 410 and 420 includes a feeder 310 and a feed hopper 320 generally as described above.

An exemplary operation of system 400 will now be described. With valves 430 and 440 closed, reactant mixture is introduced into feed hopper 320 of assembly 410, which is then closed, evacuated and purged. Valve 430 is then opened for assembly 410 to introduce reactant mixture into retort 120. Meanwhile, reactant mixture is introduced into feed hopper 320 of assembly 420, which is then closed, evacuated and purged. When assembly 410 is almost empty of reactant mixture, valve 440 is opened for assembly 420 to introduce reactant mixture into retort 120, and valve 430 is closed to load assembly 410 with more reactant mixture, as described above. When assembly 420 is near empty, valve 430 is opened, assembly 410 is again used to introduce reactant mixture into retort 120, and valve 440 is closed. The above-described procedure is repeated as needed.

Referring back to FIG. 1, the formed AlON powder is removed from retort 30 or collection hopper 160 and calcined to remove unreacted carbon. Calcining is performed in air or oxygen between about 700 and about 800° C. In an alternative embodiment, collection hopper 160 can be connected to a calcining furnace having flowing air or oxygen. Accordingly, hopper 160 can charge product mixture 170 (the formed AlON) directly into the calcining furnace. In another embodiment, hopper 160 can be equipped with flowing air so that unreacted carbon can be removed as the formed AlON powder cools to between 700 and 800° C.

The calcined AlON powder is ball milled to reduce the particle size of the powder. Ball milling is performed in polyurethane-lined, rubber-lined, or AlON-lined mills using methanol as a milling fluid, and an alumina or AlON grinding media, e.g., pellets. Milling time is about 20-30 hours, typically about 24 hours. This produces an AlON powder having a particle size less than about 8 microns, typically having an average particle size less than 3 microns. The milled powder is placed in a rotary evaporator to remove the milling fluid (methanol). Calcined AlON powder can also be ball milled using water in the place of methanol. The milled slurry can then be spray dried to form a dried powder or slip cast into shapes.

The AlON powder, milled in methanol and dried in a rotary evaporator, is then reconstituted with water, a dispersant agent (such as Duramax D3005 (Rohm and Haas, Philadelphia, Pa.)), and preferably a binder (such as Duramax B1020) to form a slurry. Adding the binder typically provides strong AlON structures with high and uniform green body density that can be made in different shapes. The slurry is spray dried to agglomerate the AlON powder into particles about 100 microns in size. This produces a free-flowing powder having a uniform fill density that can be easily poured into a mold.

The AlON powder is then formed into a green body. The AlON powder is poured into a rubber mold having a predetermined shape, agitated to uniform fill density, and cold isostatically pressed at pressures greater than 15,000 psi to produce a green body to be used in sintering (described below). Formation of the green body can include other techniques such as, for example, slip casting, and injection molding. The green body typically has a density of about 60% of the theoretical density and is formed about 20% oversized of the finished structure to compensate for shrinking from sintering and hot pressing operations (e.g., hot isostatic pressing, uniaxial hot pressing, and multiaxial hot pressing), as described below. After cold pressing, the green body is slowly heated to about 500-750° C. in air to remove residual organic material, e.g., the binder. If no binder was added to the reconstituted, milled powder, the slow heat treatment described above (500-750° C. in air) can be omitted. The formed green body is then placed in a graphite, alumina, or AlON container, which is then placed in a sintering furnace.

The AlON green body is sintered to remove and to close its porosity and to increase its density. Sintering is performed in a flowing or static atmosphere of nitrogen for about 6-10 hours, typically about 8 hours. Final sintering temperatures are higher than 1900° C., but lower than the melting temperature of AlON, which is approximately 2140° C. Sintering produces a polycrystalline body having an average grain size of less than about 20 microns. The sintered body typically has a density of about 95-99% of the theoretical density, or about 3.5 g/cc to about 3.7 g/cc.

The sintered body is then hot isostatically pressed (HIP) to further increase its density. Hot isostatic pressing is performed at about 1900° C. and about 20,000-30,000 psi, preferably about 28,000-30,000 psi, in a convective argon or nitrogen atmosphere for about 6-20 hours. This produces a body having an average grain size of about 100-350 microns, and a density of about 100% of the theoretical density. After hot isostatic pressing, the body has the appearance of light gray to dark, tinted glass.

To obtain a "water clear" structure, the hot isostatically pressed AlON body is heat treated in a flowing nitrogen atmosphere enclosed in an alumina or AlON crucible (to provide a low partial pressure of oxygen and to avoid reducing the formed AlON) at about 1900° C. for about 6-10 hours, typically 8 hours.

The heat treated body is finished to the structure by optical grinding and polishing to the final tolerances of the structure.

Other embodiments of the above-described methods are possible. For example, in addition to or as an alternative to hot isostatic pressing, sintering aids, in the form of small amounts (<0.5 wt percent) of doping additives, can be added to the AlON powder. The aids can include an element such as yttrium and lanthanum, or compounds thereof. Other lanthanides and their compounds, preferably the oxides, may also be used. A combination of the doping additives may also be used. A preferred combination includes 0.08 wt % $Y_2O_3$ and 0.02 wt % $La_2O_3$. The doping additives may be added, e.g., during the ball milling step.

Other methods of forming AlON and AlON structures, e.g. by carbothermal nitridation, are described in U.S. Pat. Nos. 4,520,116; 4,686,070; 4,720,362; 4,481,300; and 5,135,814, all hereby incorporated by reference in their entirety.

Other embodiments are within the claims.

What is claimed is:

1. A method of making aluminum oxynitride, the method comprising:
    (a) providing a chamber;
    (b) introducing aluminum oxide particles and carbon particles into the provided chamber;
    (c) reacting the aluminum oxide particles and carbon particles introduced into the provided chamber with nitrogen, comprising:
        mixing the aluminum oxide particles and carbon particles within the provided chamber;
        passing nitrogen gas over the mixing aluminum oxide particles and carbon particles with the mixing aluminum oxide particles and carbon particles being at a temperature sufficient to convert the aluminum oxide particles, carbon particles and nitrogen into the aluminum oxynitride during the conversion of the aluminum oxide particles, carbon particles and nitrogen into the aluminum oxynitride; and
    (d) removing the aluminum oxynitride from the chamber;
wherein the mixing comprises rotating the chamber;
further comprising:
    forming the aluminum oxynitride into a transparent structure;
wherein forming the aluminum oxynitride comprises:
    forming a green body comprising the aluminum oxynitride; and
    sintering the green body,
further comprising: isostatically pressing the sintered green body under heat.

* * * * *